Aug. 4, 1931.  A. UHLIG  1,817,277
ARRANGEMENT FOR COOLING AND HEATING BEDS
Filed April 3, 1930
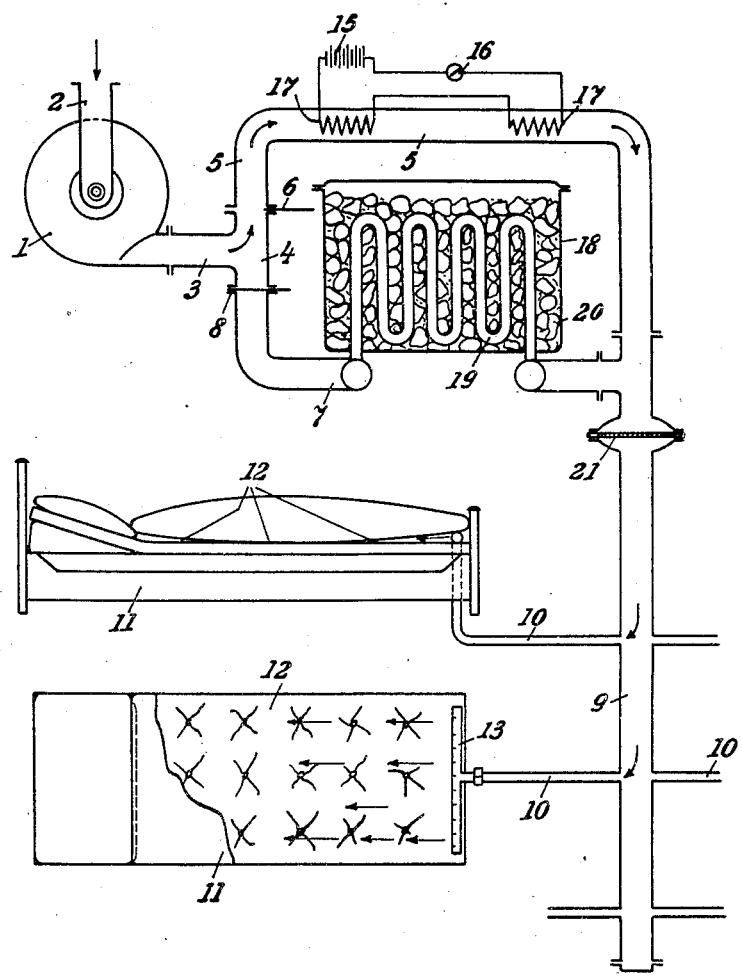
Inventor
Albert Uhlig Patented Aug. 4, 1931

1,817,277

UNITED STATES PATENT OFFICE

ALBERT UHLIG, OF RORSCHACH, SWITZERLAND

ARRANGEMENT FOR COOLING AND HEATING BEDS

Application filed April 3, 1930, Serial No. 441,382, and in Switzerland June 4, 1929.

It is generally known, that it is desirous to heat beds in winter and to cool the same in summer.

The commonly used devices for heating beds in the winter heat only certain portions and their use is connected with dangers such as explosions of water bottles and inflagrations when heating cushions are used.

This invention relates to an arrangement for cooling and heating beds, by which certain inconveniences connected with the hitherto used apparatus have to be obviated.

This is attained by a pipe system in which a blower, an electric heating body and a cooling body are mounted, said bodies adapted to be switched in or cut out as desired, the pipe system communicating with the distributing elements mounted in the bed.

An embodiment of the invention is illustrated by way of example in the only figure of the accompanying drawing, showing diagrammatically a bed in side elevation and a bed in top plan view and further the pipe system and accessories.

A blower 1, preferably driven from an electromotor, has a suction pipe 2 communicating with the atmosphere and a pressure pipe 3 terminating in a flanged transverse pipe 4. At the one end of the transverse pipe 4 a heating pipe 5 is fixed, a register 6 being inserted between 4 and 5. To the other end of the transverse pipe 4 a cooling pipe 7 is connected, a register 8 being inserted between 4 and 7. The heating pipe 5 and the cooling pipe 7 end both in a common pipe 9, from which branch pipes 10 lead to the beds.

At the foot end of each bed a distributing pipe 13 is arranged, fixed on the end of the corresponding branch pipe 10 and situated in the space 12 between the sheet and the blanket. If a person is lying in the bed, the space 12 is sufficiently wide to permit of a free passage of the supplied air.

In the heating pipe 5 heating bodies 17 are mounted, to which current is supplied from a source of current 15, a switch 16 being inserted in the circuit. When the heating bodies are switched in, the air in the heating pipe is heated.

In the cooling pipe 7 a serpentine pipe 19 is inserted, which is located in a refrigerating box 18, having a filling 12 of ice and salt.

According to the position of the registers 6 and 8 the air coming from the blower 1 can flow either through the heating pipe 5 or through the cooling pipe 7 and serpentine pipe 19, so that into the space 12 in the bed 11 either heated air or cold air is delivered through pipe 9, branch pipes 10 and distributing pipes 13.

The distributing pipe 13 might be mounted in a hollow space in the mattress, in which case the distributing pipe is a serpentine pipe; or several straight pipes may extend along the foot and the sides of the bed.

The air blown into the bed may be disinfected or perfumes may be admixed with the same. In the pipe 9 a filter 21 is mounted which may be disinfected or rendered odorous by means of the air flowing through. The pipes 5, 7, 9 and 10 are preferably covered with insulating material, so that loss of heat or cold is avoided.

The driving motor for the blower is preferably electrically connected with the circuit of the electric heating bodies so that these heating bodies cannot be switched in without simultaneous switching in of the blower.

The installation or arrangement described and shown is suitable for domestic use or for hospitals, as any desired number of branch pipes 10 can be branched from the common pipe 9.

For patients as well as for people of good health it is useful and agreeable to have the bed heated or cooled as required.

I claim:—

1. An arrangement for heating or cooling beds, comprising in combination a blower, a heating pipe connected with said blower, a cooling pipe connected with said blower, a common pipe to which said heating pipe and said cooling pipe are connected, electric heating bodies in said heating pipe, a refrigerator interposed in said cooling pipe, branch pipes one for each bed branching from said common pipe, a distributing pipe at the end of each branch pipe situated in the foot end of each bed, and means for selectively connecting with said blower said heating pipe or said cooling pipe.

2. An arrangement as specified in claim 1, comprising in combination with the pressure pipe of the blower the heating pipe and the cooling pipe, registers one between said heating pipe and said blower and the other one between said cooling pipe and said blower.

3. An arrangement as specified in claim 1, comprising in combination with the cooling pipe, a refrigerator box filled with ice and salt, and a serpentine pipe in said box, terminating at both ends in said cooling pipe.

4. An arrangement as specified in claim 1, comprising in combination with the common pipe, a filter in said common pipe designed to contain disinfecting substances or perfuming substances.

In testimony whereof I affix my signature.

ALBERT UHLIG.